United States Patent [19]

Doi et al.

[11] 4,248,523

[45] Feb. 3, 1981

[54] ELECTROPHOTOGRAPHIC COPYING APPARATUS EQUIPPED WITH IMPROVED COPY PAPER CUTTING ARRANGEMENT

[75] Inventors: Yasuhiko Doi; Shigemitsu Shimizu; Toshio Matsui; Yoshihisa Kawai; Yutaka Irie; Norihiko Suzuki; Soichi Iwao, all of Toyokawa, Japan

[73] Assignee: Minolta Camera Kabushiki Kaisha, Osaka, Japan

[21] Appl. No.: 54,567

[22] Filed: Jul. 3, 1979

[30] Foreign Application Priority Data

Jul. 12, 1978 [JP] Japan .................................. 53-85483

[51] Int. Cl.3 ...................... G03G 15/00; G03B 29/00

[52] U.S. Cl. .......................................... 355/13; 355/8; 355/29

[58] Field of Search .................................... 355/27-29, 355/47, 48, 13, 8

[56] References Cited

U.S. PATENT DOCUMENTS

| | | | |
|---|---|---|---|
| Re. 28,828 | 5/1976 | Komori et al. | 355/13 X |
| 3,535,038 | 10/1970 | Stievenart et al. | 355/28 X |
| 3,651,727 | 3/1972 | Suzuki et al. | 355/13 X |
| 3,950,090 | 4/1976 | Washio et al. | 355/8 |
| 3,951,544 | 4/1976 | Mikasa | 355/29 |
| 4,126,389 | 11/1978 | Ikeda et al. | 355/13 |

*Primary Examiner*—Donald A. Griffin

*Attorney, Agent, or Firm*—Wenderoth, Lind & Ponack

[57] ABSTRACT

An electrophotographic copying apparatus equipped with an improved copy paper cutting arrangement in which a distance between an exposure position and a transfer position along a photosensitive drum is made larger than a distance between a copy paper cutting position and the transfer position so as to actuate a cutter device after termintion of the exposure through a cutter operating mechanism.

9 Claims, 20 Drawing Figures

ELECTROPHOTOGRAPHIC COPYING APPARATUS EQUIPPED WITH IMPROVED COPY PAPER CUTTING ARRANGEMENT

BACKGROUND OF THE INVENTION

The present invention relates to an electrophotographic copying apparatus and more particularly, to an electrophotographic copying apparatus which employs copy material or copy paper in a roll form and in which turbulence or blur of copied images is advantageously prevented.

Conventionally, in the electrophotographic copying apparatuses employing copy paper in a roll form, there are two systems for achieving proper positioning of the copy paper relative to an image formed on a photosensitive drum. More specifically, in one of the systems, the leading edge of the copy paper is detected while the copy paper is being moved, and the detection signal obtained thereby is utilized for moving an original platform (or optical system), while in the other of the systems, the copy paper is first fed to a positioning device provided at a distance from the transfer position shorter than the distance between a position corresponding to start of an exposure and a transfer position for subsequent re-starting of the copy paper in synchronization with the image of an original formed on the photosensitive member.

The conventional arrangements as described above, however, have disadvantages that in the first system, since the accuracy with respect to the starting position for movement of the original platform (or optical system) directly affects the accuracy of the positioning, a special positioning device for the original platform (or optical system) is required, while in the second system, not only is a special positioning device required along the path of the copy paper, but the circuitry involved is inevitably complicated for controlling such special positioning device. Moreover, in both of the known systems as described in the foregoing, copy paper detecting means is required to be disposed in the path of the copy paper, and if a detecting device of the contact type such as a microswitch or the like is employed for the detecting means, copy paper jamming tends to be caused thereby, while employment of a detecting device of the non-contact type such as a photosensor, etc. results in high cost of the copying apparatus. Additionally, the conventional systems as described in the foregoing have a fatal disadvantage that, since cutter means is arranged to be actuated during exposure for cutting the copy paper, vibrations from the impact at the moment of cutting are undesirably transmitted to the optical systems, etc., thus giving rise to blurring or the like in the copied images. Furthermore, in a known system in which a rotary blade of the cutter means is arranged to be returned to a cutting stand-by position after the cutting by utilization of the driving force of a driving system, variation in the driving torque during winding for the returning movement also gives rise to deviation in the synchronization of the optical system, etc., with consequent adverse effects on the copied images.

Furthermore, in the known copying apparatuses of the above described type, there is incorporated a cutter operating device or more particularly, a so-called step by step cutting system by which the copy paper in roll form is cut into predetermined sizes, such as A4, B5 sizes, etc. In a copying apparatus equipped with the cutter operating device of the above described type, a cut signal for driving the cutter means is obtained by an arrangement in which the starting position of rotating cam means is altered so as to correspond to respective paper sizes for actuating stationary switch means by said cam means or by another arrangement in which a plurality of switches corresponding to respective sizes are disposed at predetermined positions around the cam means and only the switch for the size corresponding to the original being copied is made conductive. The conventional arrangements as described above, however, have disadvantages in that they have a complicated structure, thus resulting in a high cost, and particularly, in the cam rotating type, a subsequent copying operation can not be started until the cam means completes one rotation, so that the same copying time required for a large-sized original is required even for a small-sized original, with consequent reduction of the copying efficiency.

SUMMARY OF THE INVENTION

Accordingly, an essential object of the present invention is to provide an electrophotographic copying apparatus equipped with an improved copy paper cutting arrangement in which cutter means is arranged to be actuated after termination of projection of an original image onto a photosensitive drum so as to eliminate the adverse effect on copied images due to vibrations produced during functioning of the cutter means.

Another important object of the present invention is to provide an electrophotographic copying apparatus equipped with an improved cutter operating mechanism in which cutting signals for respective sizes can be obtained by a simple structure.

A further object of the present invention is to provide an electrophotographic copying apparatus of the above described type which functions accurately and stably and with a high reliability, and can be readily manufactured at low cost.

For accomplishing these and other objects, according to the present invention, there is provided an electrophotographic copying apparatus which comprises a rotatable photosensitive drum having a photosensitive surface on the outer periphery thereof, a scanning system for projecting an image of an original to be copied onto an exposure position on said photosensitive surface in synchronization with the rotation of said photosensitive drum so as to form the image of the original on said photosensitive surface, a transfer device for transferring the image formed on said photosensitive surface onto copy paper at a transfer position, and cutter means for cutting copy paper in a roll form into a predetermined size at a copy paper cutting position which is positioned so that the distance between the exposure position and the transfer position along said photosensitive surface is larger than the distance between the copy paper cutting position and said transfer position so that the cutter means can be actuated after termination of the exposure by cutter operating means.

By the arrangement according to the present invention as described above, adverse effects on the copied images such as blurring and the like due to vibrations produced during functioning of the cutter means are advantageously eliminated.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
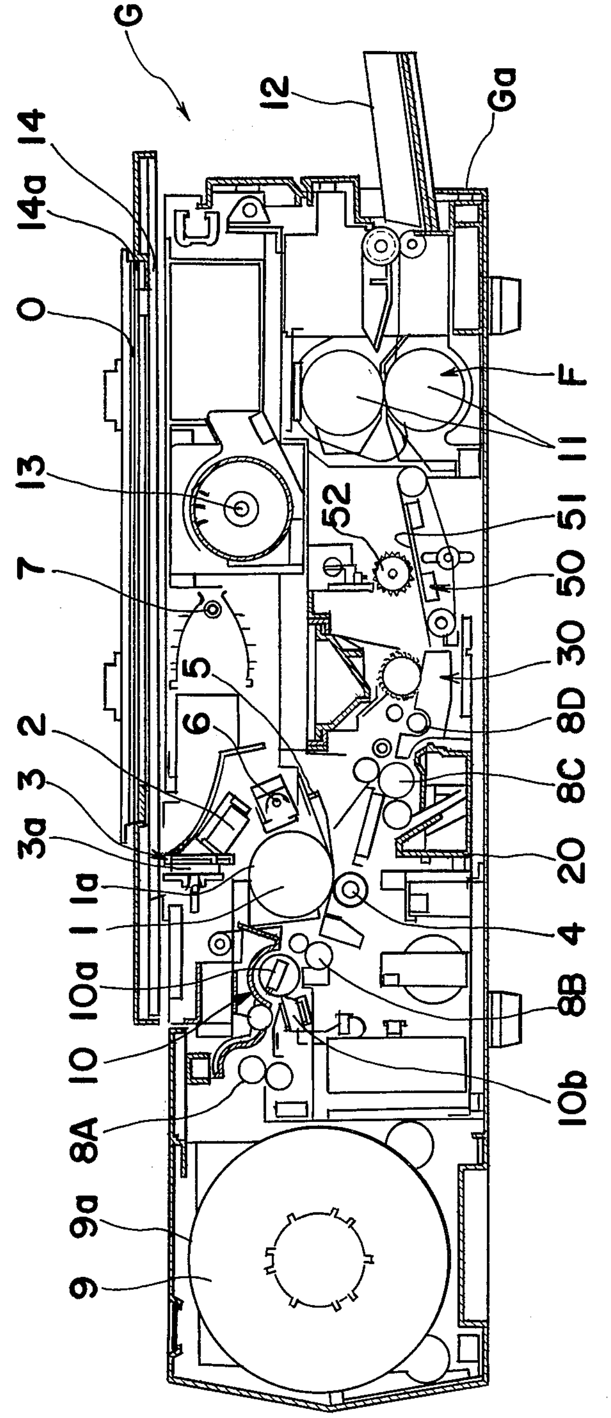
FIG. 1 is a schematic side sectional view of an electrophotographic copying apparatus according to one preferred embodiment of the present invention.

Referring now to the drawings, there is shown in FIG. 1 an electrophotographic copying apparatus G having a movable original platform according to one preferred embodiment of the present invention. The copying apparatus G generally includes an apparatus housing Ga having a rectangular box-like configuration, a photosensitive drum 1 having a photosensitive surface 1*a* provided around the outer periphery thereof and rotatably disposed at an approximately central portion of the housing Ga, a corona charger 2 for uniformly charging the photosensitive surface 1*a*, an optical system 3 further including a known image transmitter 3*a* formed of a bundle of a plurality of graded index fibers for projecting an image of an original O onto the photosensitive surface 1*a* of the photosensitive drum 1 so as to form an electrostatic latent image of the original O on said surface 1*a*, and, disposed sequentially around the drum 1, a transfer roller 4 for transferring the electrostatic latent image onto copy paper, a copy paper separating device 5 for separating the copy paper from the photosensitive surface 1*a*, and a charge eraser 6 for erasing residual charge remaining on the photosensitive surface 1*a* after the transfer. The platform or carriage 14 has a light transmitting or transparent plate 14*a* of glass material or the like for supporting the original O to be copied thereon and which is reciprocatingly mounted on the upper portion of the housing Ga, with an exposure lamp 7 for illuminating the original O and a cooling fan 13 being disposed below and adjacent to the platform 14 at the right-hand side of the optical system 3. As the platform 14 moves, the light image of the original O placed on the platform 14 and illuminated by the exposure lamp 7 is projected onto the photosensitive surface 1*a* of the drum 1 preliminarily charged by the corona charger 2 so as to form an electrostatic latent image of the original O on the photosensitive surface 1*a*. After the elapse of a predetermined period of time, a pair of copy paper feeding rollers 8A provided adjacent to a roll 9 of copy paper 9*a* which is disposed at the left-hand side of the housing Ga are driven for feeding the copy paper 9*a* drawn off the roll 9 toward the transfer roller 4 through the cutter means 10 having a rotary blade 10*a* and a stationary blade 10*b* and another pair of feeding rollers 8B. The transfer roller 4 presses the copy paper against the drum 1 so that the electrostatic latent image formed on the photosensitive surface 1*a* is transferred onto the copy paper 9*a* which has been cut to a predetermined size by the cutter means 10 in a manner as described in detail later. The copy paper 9*a* onto which the latent image has been transferred as described above is separated from the photosensitive surface 1*a* of the drum 1 by the separating device 5 and is further transported to the developing device 30 through feeding rollers 8C and 8D, while having the reverse face humidified by a water applying device 20 disposed between the transfer roller 4 and the developing device 30. After the latent image on the copy paper is developed into a visible image, the copy paper 9*a* is fed, by a transporting device 50 having rotary discs 52 and an endless transportation belt 51 movably supported by a plurality of rollers, to a known fixing device F including a pair of pressure rollers 11 for fixing the visible image onto the copy paper 9*a*, and is then discharged onto a tray 12. Meanwhile, the photosensitive surface 1*a* which has passed the transfer roller 4 as the photosensitive drum 1 rotates has the residual charge erased by the charge eraser 6 for subsequent repetition of the processes similar to those as described in the foregoing.

Figure 2:
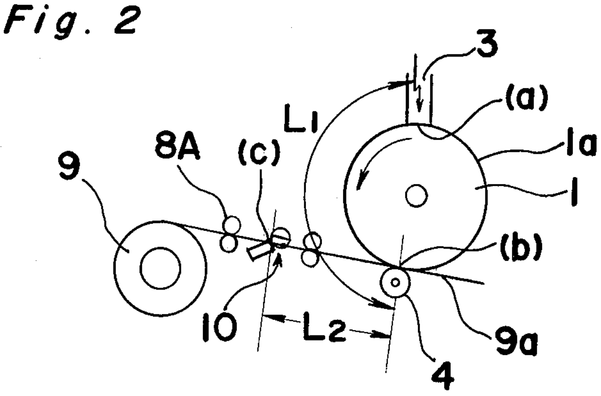
FIG. 2 is a schematic side elevational view for explaining the relations between an exposure position and a transfer position, and also between a copy paper cutting position and the transfer position in the copying apparatus of FIG. 1.

Referring particularly to FIG. 2, according to the present invention, the distance L1 on the photosensitive surface 1*a* of the drum 1 between the exposure position (a) facing the optical system 3 and the transfer position (b) contacting the transfer roller 4 is made larger than the distance L2 between the copy paper cutting position (c) of the cutter means 10 and the transfer position (b), and when the platform 14 has moved, following the starting of the exposure, to a position where the distance between the leading edge of the electrostatic latent image on the drum 1 and the transfer position (b) becomes equal to the distance L2, i.e. to a position where the image on the photosensitive surface 1*a* is the same distance from the transfer point as is the copy paper 9*a*, a copy paper feeding starting switch (not shown here) is actuated by the platform 14 for driving the copy paper feeding rollers 8A to feed the copy paper. In other words, since no switch means or the like for copy paper detection is provided along the transportation path of the copy paper, there is nothing to cause copy paper jamming along this transportation path. Subsequently, when the platform 14 is displaced to a designated cut position, a cutter driving lever (not shown here) of a cutter operating mechanism described in detail later is actuated, and the copy paper 9*a* drawn off the copy paper roll 9 is cut to a predetermined length. After the cutting, a cutter winding up detecting switch (not shown) is actuated for winding up the rotary blade 10*a* by the driving force of the feeding rollers against the urging force of a spring (not shown). In the above arrangement, the cutter means is actuated after termination of the exposure based on the relation L1>L2 as described earlier, and therefore, the optical system 3, etc. is not adversely affected during exposure by the functioning of the cutter means 10, whereby undesirable generation of turbulence or blurring in the copied images is advantageously prevented.

Referring to FIGS. 3 to 7, the cutter operating mechanism referred to above will be described hereinbelow.

Figure 3:
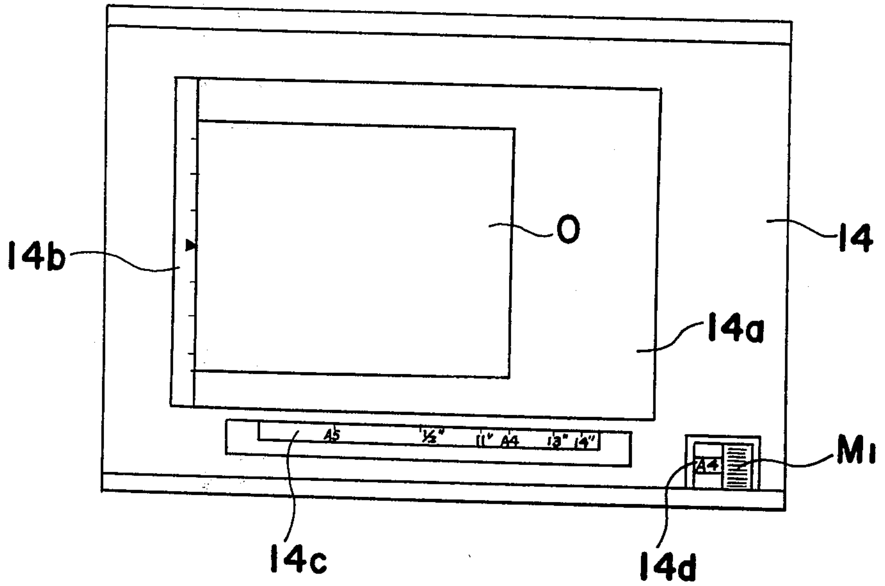
FIG. 3 is a top plan view, on an enlarged scale, of an original platform employed in the copying apparatus of FIG. 1.

As shown in FIG. 3, the original O to be copied is placed on the transparent plate 14*a* of the platform 14, with the surface of the original O directed downward and the end edge thereof aligned with a corresponding side edge of a scale plate 14*b* provided at one end edge of the plate 14*a*. Along the lower, as seen in the Figures, side edge of the transparent plate 14*a*, there is provided a lateral scale plate 14*c* with a plurality of graduations, for example A5, 8½", 11", A4, 13" and 14" for identifying the sizes of the most common originals so that an operator may immediately know the length of original. To cause the copying paper 9*a* to be cut to the length of the original, provided that the size of original is one of the most common sizes, the step by step cutting mechanism M is provided which includes a manually rotatable setting dial M1 (FIG. 4) having a portion protruding from the platform 14 through a window 14*d* formed at one corner of said platform 14.

Figure 4:
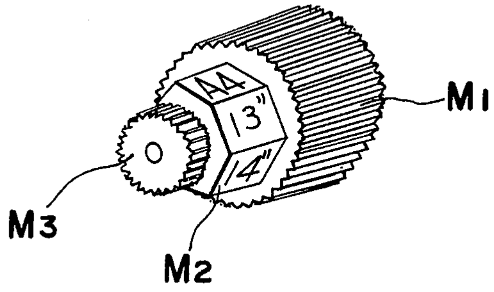
FIG. 4 is a perspective view showing on an enlarged scale, the structure of a setting dial for a step by step cutting mechanism employed in the copying apparatus of FIG. 1.

As can be seen from FIG. 4, the setting dial M1 has an indication rod M2 of hexagonal cross section integrally formed or rigidly connected therewith and marked with various graduations such as A4, 13", 14", etc. on corresponding hexagonal faces. Thus, if the original is an A4 size and if the copying paper is to be cut to A4 size, the operator rotates the dial M1 until the mark "A4" on the rod M2 is exposed from the window 14*d* as in FIG. 5.

Figure 5:
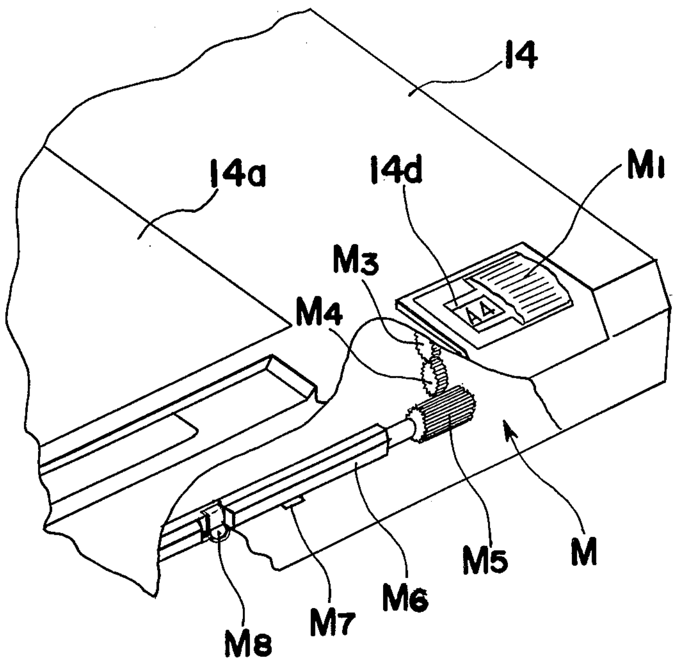
FIG. 5 is fragmentary perspective view of an original platform partly broken away, showing the construction of the step by step cutting mechanism employed in the copying apparatus of FIG. 1.
Figure 6:
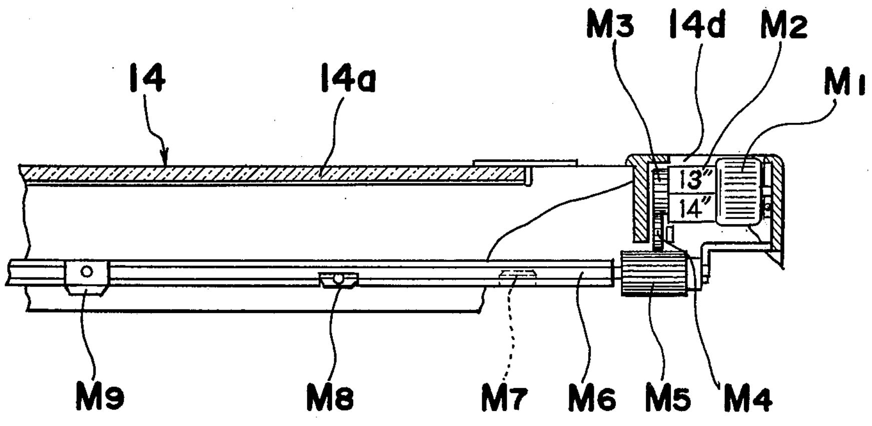
FIG. 6 is a fragmentary side sectional view of the original platform of FIG. 5.

The dial M1 also has a first gear M3 integrally formed with or rigidly connected to the indication rod M2 and in mesh with a second gear M4 which in turn is in engagement with a third gear M5 (See FIGS. 5 and 6). The third gear M5 is integrally formed with or rigidly connected to an operating rod M6 of hexagonal cross section for simultaneous rotation therewith, while operating pieces M7, M8, M9, . . . and Mn are secured on respective peripheral faces of the rod M6. More specifically, the operating pieces M7, M8, M9, . . . and Mn are respectively secured on the peripheral faces of the rod M6 so as to protrude therefrom and be positioned at different locations to respectively correspond with given sizes, such as A4 size, 13" size, etc. Thus, if the operating pieces M7, M8 and M9 correspond with 14", 13" and A4 sizes, the operating piece M8 will be positioned at 25.4 mm (1 inch) from the operating piece M7 and the operating piece M9 will be positioned at 33 mm (1.3 inch) from the piece M8. The length of the A4 size is 297 mm (11.7 inches). Depending on the size selected, one of the operating pieces will actuate an actuating lever 210 described later during the movement of the platform 14. For this purpose, it should be noted that regardless of the size selected by rotating the dial M1, the corresponding operating piece will be at such a position as to protrude into a path for actuating the actuating lever 210 and the other operating pieces will be out of said path.

Figure 7:
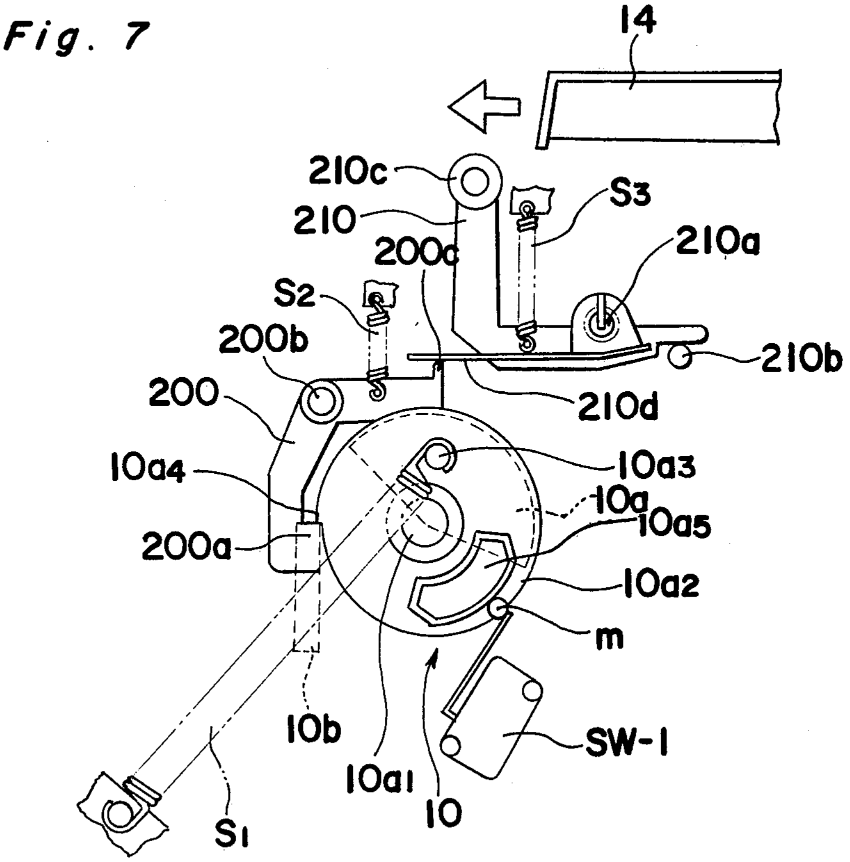
FIG. 7 is a schematic side elevational view showing a lever and microswitch arrangement coupled to the step by step cutting mechanism of FIG. 5.

In FIG. 7, the rotary blade 10*a* of the cutter means 10 rotatably supported on a shaft 10*a*1 on the frame (not shown) of the apparatus housing Ga has a disc 10*a*2 integrally formed or rigidly connected therewith and normally urged counterclockwise for simultaneous rotation therewith by a spring S1 having its one end connected to a pin 10*a*3 provided on the disc 10*a* 2 and its other end fixed to the frame (not shown) of the apparatus housing Ga. The disc 10*a*2 has a notch or detent portion 10*a*4 positioned in the peripheral edge thereof and normally engaging one protruding end 200*a* of a stop lever 200 pivotally supported on a pin 200*b* and urged counterclockwise by a spring S2 connected between the other end of the lever 200 and the frame of the apparatus housing Ga. When the protruding end 200*a* of the lever 200 disengages from the detent portion 10*a*4 of the disc 10*a*2 in the manner as described later, the disc 10*a*2 is rotated together with the rotary blade 10*a* to cut the copy paper. The disc 10*a*2 is arranged to rotate exactly one full rotation and to stop by the engagement of the detent portion 10*a*4 with the end 200*a* of the stop lever 200 when the lever 200 has returned to its original position.

In a position above and adjacent to the lever 200, the actuating lever 210 having a substantially L-shape is rotatably supported on a pin 210*a* and normally urged clockwise by a spring S3 connected between said lever 210 and the frame of the apparatus housing Ga, with one end of the lever 201 being held in contact with a stop 210*b*. The actuating lever 210 has at its other end an actuating piece 210*c* to be engaged by one of said operating pieces M7, M8, M9, . . . and Mn during the movement of the platform 14. Also provided on the lever 210 is a lever actuating plate 210*d* having its one end normally in light contact with a distal end 200*c* of the stop lever 200. Upon engagement of actuating piece 210*c* of the lever 210 by one of the operating pieces, the lever 210 rotates counterclockwise about the pin 210*a* causing the lever actuating plate 210*d* to depress the distal and 200*c* of the stop lever 200. This results in clockwise rotation of the stop lever 200 thereby disengaging the protruding end 200*a* from the detent portion 10*a*4 of the disc 10*a*2 to initiate rotation of the disc 10*a*2 together with the rotary blade 10*a* as one unit.

The disc 10*a*2 further includes a control cam 10*a*5 provided thereon and normally in contact with an actuating piece m of a microswitch SW-1 when the disc 10*a*2 is held in the position shown in FIG. 7. As the disc 10*a*2 is rotated, the cam 10*a*5 disengages from the actuating piece m to actuate the microswitch SW-1. The actuation of the microswitch SW-1 causes the feed rollers 8A to become deenergized so as to stop feeding of copying paper and simultaneously causes the forward movement of the platform 14 to terminate and in turn returns the platform 14 to the initial position.

Referring back to FIG. 2 showing the relationship between distances from the exposure position (a) to the transfer position (b) and from the cutting position (c) to the transfer position (b), as described earlier, the distance L2 from the cutting position (c) from which the copying paper 9*a* is fed to the transfer position (b) is shorter than the distance L1 which is the peripheral distance from the exposure position (a) where the image of original is projected onto the photosensitive surface 1*a* of the drum 1. More specifically, if the distance L2 is set to be 75.5 mm, for example, the distance L1 is 81.2 mm. This means that the copying paper 9*c* which has the leading edge thereof at the cutter means 10 starts to be fed only after the exposure of original image during the forward movement of the platform 14 has begun since the copying paper 9*a* is fed with such timing that the leading edge thereof coincides with the leading edge of the latent image formed on the drum 1 at the transfer position (b). Thus, the feed rollers 8A are energized to start the feed of copy paper 9*a* when the original has been scanned for a distance equal to the difference between L1 and L2 which is 5.7 mm. From the foregoing, it can also be understood that the cutting of the copy paper to a size corresponding to the size of the original of standard size is effected only after the completion of exposure of original.

In operation, the original O to be copied is placed on the transparent plate 14*a* of the platform 14 with the edge thereof aligned with the side edge of the scale plate 14*b*. Assuming that the size of the original O is the A4 size, the setting dial M1 is rotated until the mark "A4" on the indication rod M2 appears through the window 14*d*. The rotation of dial M1 causes the operating rod M6 to rotate through gears M3, M4 and M5 so as to bring one of operating pieces into position for actuation of the actuating lever 210.

Upon actuation of print switch (not shown), the platform 14 begins to move leftward and as the edge of the original on the plate 14*a* passes over the optical system 3, the light image thereof is successively projected onto the photosensitive surface 1*a* of the rotating photosensitive drum 1. It will be noted that the image exposure does not immediately begin with the start of movement of the platform 14, but requires the platform 14 to move for about 7 cm before the edge of the original passes over the optical system 3. The reason for this is because the image projected tends to become blurred due to mechanical vibrations of the platform 14 upon start of movement thereof if the image is projected immediately and because the exposure lamp 7 requires some time before it illuminates at full power when it is energized simultaneously with the movement of the platform 14.

Shortly after the image exposure has begun, the feed rollers 8A are energized to feed the copying paper 9*c* from the cutter means 10 to the transfer position (b). The paper arrives at the transfer roller 4 in coincidence with the arrival of leading edge of the latent image on the drum 1 so that the image is successively transferred onto the copy paper 9*c*. As the platform 14 moves further to project the image of original O, one of the operating pieces M7, M8, M9, . . . and Mn on the operating rod M6 approaches the actuating piece 210*c* of the lever 210. Shortly after the completion of full scan of the the original O by the movement of the platform 14, i.e., when the copy paper 9*c* has been fed a distance just about corresponding to the length of the original, which in this case is the A4 size, the operating piece engages the actuating piece 210*c* of the lever 210. This causes the actuating lever 210 to rotate about the pin 210*a* in the counterclockwise direction which in turn causes the stop lever 200 to rotate clockwise. This results in disengagement of protruding end 200*a* of the lever 200 from the detent portion 10*a*4 of disc 10*a*2. Accordingly, the disc 10*a*2 together with the rotary blade 10*a* rotates to cut the copy paper 9*c* into the length of the original 0. During the rotation of the disc 10*a*2, the control cam 10*a*5 disengages from the microswitch SW-1 to actuate the same and this causes the feed rollers 8A to become deenergized to halt the feeding of the paper 9*c*, and also causes the forward movement of the platform 14 to terminate simultaneously. (The platform 14 has thus moved the sum of the distance 7 cm, the length of the original and the difference between L1 and L2.) The platform 14 then immediately makes a reverse movement to return to the initial position. The copy paper 9*c* cut to the length of the original is then developed, fixed and discharged out onto the tray 12.

It should be noted here that the operating rod M6 having the hexagonal cross section described as employed in the foregoing embodiment may be replaced by an operating rod having a polygonal cross section for increasing the number of sizes which can be set thereby, and that such an operating rod may have a circular cross section on which the actuating pieces for the respective sizes can be fixed at predetermined positions on the outer periphery of the circular cross section operating rod. Similarly, the arrangement including the actuating levers 200 and 210, and microswitch SW-1 described as employed in the foregoing embodiment may be replaced by a single operating switch (not shown) disposed in the path of the selected one of the operating pieces M7, M8, M9, . . . and Mn during movement of the platform 14, with the positional relation between the operating switch and the operating pieces being determined by factors such as the speed and timing, etc. of the transportation of the copy paper so that upon closure of said operating switch connected to the driving mechanism of the cutter means 10, the cutter means 10 is actuated.

It should further be noted that, although the cutter driving mechanism of the invention is mainly described in the foregoing with reference to a copying apparatus having a movable original platform, the arrangement is not limited in its application to a movable platform type copying apparatuses, but may readily be applied to any copying apparatus having a scanning system. For example, for the application of the above arrangement to a copying apparatus having a movable optical system, it may be so modified that the operating rod, setting dial, etc. are fixedly provided on the side of the apparatus housing, with the actuating switch being provided on the movable optical system. More specifically, in the above case, the operating piece set to the required size remains stationary in the path of movement of the operating switch, while the operating switch moving according to the scanning of the optical system contacts the operating piece for actuating the cutter means.

Additionally, a random cutting mechanism as described in U.S. Pat. No. Re. 28,828 may be used instead of the step by step cutting mechanism, provided that the cutting is effected only after the termination of the exposure.

Referring to FIGS. 8 to 20, the constructions of the water applying device 20, the developing device 30, the transporting device 50 and an original platform driving mechanism 70 employed in the copying apparatus of FIG. 1 will be described hereinbelow.

Figure 8:
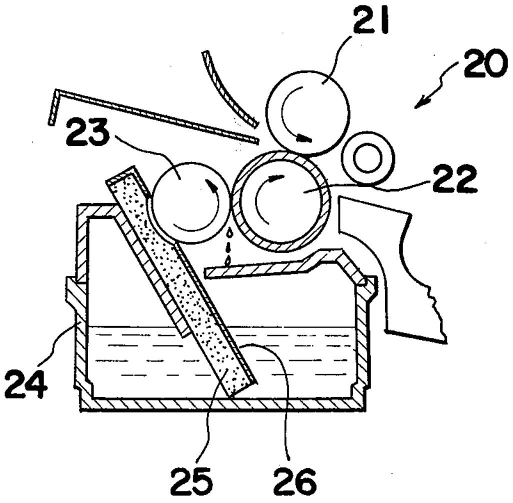
FIG. 8 is a schematic side sectional view of a water applying device employed in the copying apparatus of FIG. 1.
Figure 9:
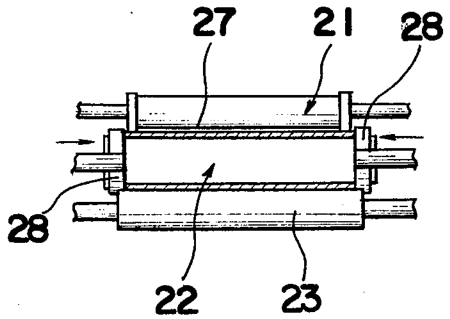
FIG. 9 is a front view partly in section showing the arrangement of rollers employed in the device of FIG. 8.
Figure 10:
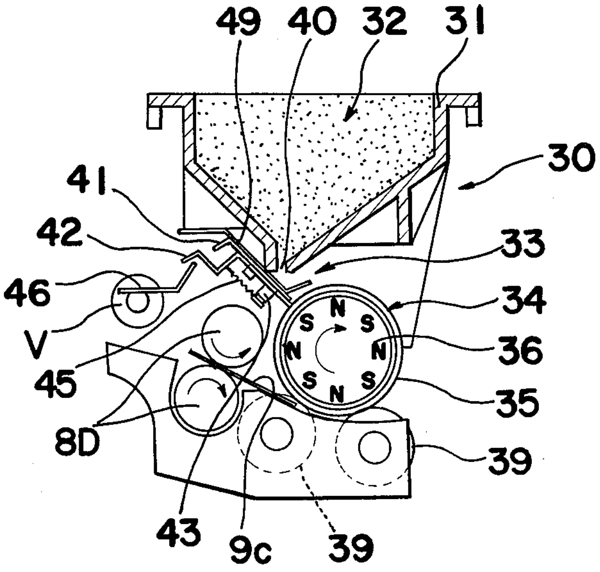
FIG. 10 is a schematic side sectional view of a developing device employed in the copying apparatus of FIG. 1.

The water applying device 20 is intended to prevent soiling of the copy paper background, etc. by increasing the electrical conductivity of the copy paper 9*c* by the application of water to the reverse surface of the copy paper for humidification, and generally includes a stepped roller 21, an elastic roller 22 of rubber material or the like, a squeezing roller 23, a water tank 24, and a water feeding felt member 25 having the lower end immersed in the water contained in the water tank 24 and having a cloth 26 on one surface for being set at a predetermined water feeding speed and water feeding height as shown in FIGS. 8 and 9. The water drawn up by the felt member 25 is supplied by the surface of the squeezing roller 23 which is in contact with the felt member 25, to the elastic roller 22 so as to be applied onto the reverse surface of the copy paper 9*c* fed between the stepped roller 21 and elastic roller 22. The squeezing roller 23 is arranged to squeeze out excess water from the elastic roller 22, while the stepped roller 21 has large diameter portions at opposite ends thereof for providing a copy paper path having a uniform clearance of about 0.2 mm with respect to the elastic roller 22. If the clearance is smaller than the above limit, there is a possibility that the front surface of the copy paper will be undesirably wetted, while on the other hand, if the clearance is too large, water may be unevenly applied. The surface of the elastic roller 22 should preferably have a wave filtering maximum swelling pitch in the range of 4 to 5$\mu$ and a maximum swelling height or crest value of approximately 10$\mu$ in coarseness. The elastic roller 22 is further provided with water drain-off sponge-like members 28 mounted at opposite sides thereof for preventing water from entering at the end faces of the elastic roller 22. On the other hand, the water tank 24 and water feeding felt member 25 are releasably mounted on the apparatus housing Ga.

Figure 11:
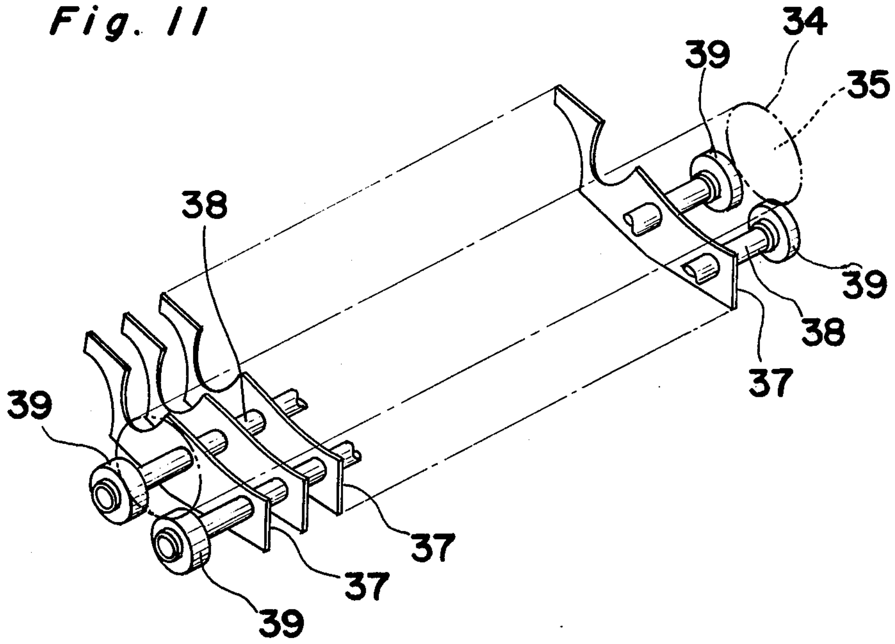
FIG. 11 is a perspective view particularly showing an arrangement for supporting a developing roller employed in the developing device of FIG. 10, FIGS. 12 and 13 are front elevational views for explaining the functions of movable magnetic brush height regulating plates of a doctor blade employed in the developing device of FIG. 10.

As shown in FIGS. 10 to 13, the developing device 30 generally comprises a container or hopper 31 containing therein mono-component electrically conductive magnetizable toner 32 and having a toner feeding opening 40 formed in the lower portion thereof, a developing roller 34 including a stationary outer cylinder or sleeve 35 in which a rotary magnet member 36 composed of a plurality of permanent magnets with alternately different polar orientation is rotatably accommodated, and a doctor blade 33 having magnetic brush height regulating plates 41 and 42 to be described later and disposed in a position between the opening 40 of the hopper 31 and the surface of the sleeve 35. The opposite ends of the sleeve 35 for the developing roller 34 are supported by circular sleeve support members 39 which are respectively mounted on corresponding opposite ends of a pair of spaced shafts 38 extending through a plurality of opposed guide fins 37 as shown in FIG. 11. If necessary, the above arrangement may be modified so that the sleeve support members 39 are omitted, with the stationary sleeve 35 instead being provided with stepped portions at its opposite sides so as to be directly mounted on the guide fins 37.

Figure 12:
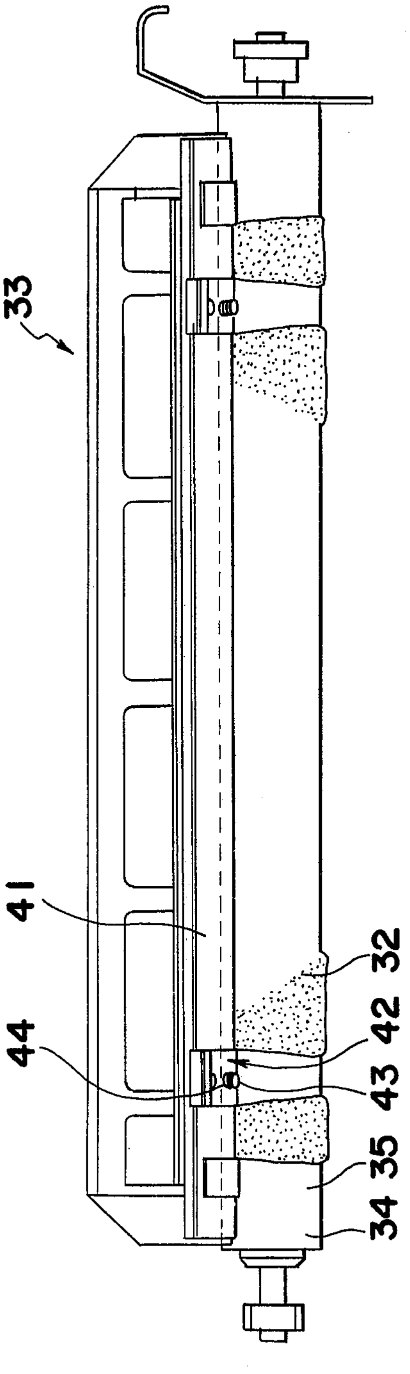
Figure 13:
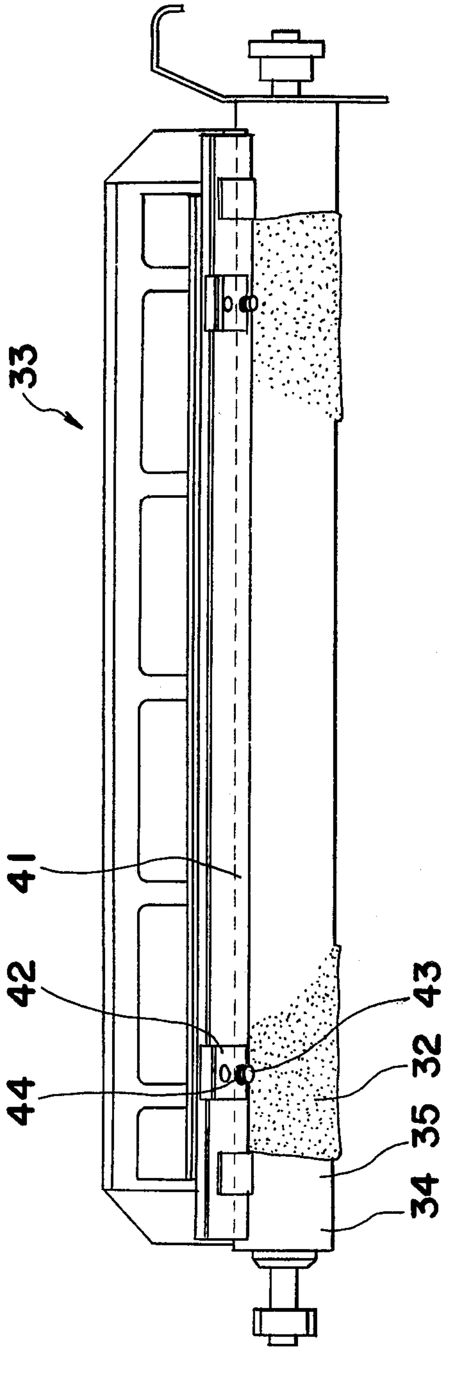

The doctor blade 33 secured to the hopper 31 and disposed between the toner supplying opening 40 of the hopper 31 and the sleeve 35 of the developing roller 34 includes the fixed magnetic brush height regulating plate 41 and movable magnetic brush height regulating plates 42 provided on opposite sides of the regulating plate 41 for upward and downward movement as shown in FIGS. 12 and 13. A pin 43 provided on the stationary regulating plate 41 at a position corresponding to each movable regulating plate extends through an elongated slot 44 formed in the corresponding movable regulating plate 42, and a spring 45 is connected at its one end to the pin 43, and the other end of the spring 45 is connected to the movable regulating plate 42 for normally urging the regulating plate 42 toward the developing roller 34. Additionally, each of the movable regulating plates 42 is guided for movement by a guide pin 49 provided on the stationary regulating plate 41 and extending through an elongated slot (not shown) formed in the movable regulating plate 42. Moreover, the movable regulating plates 42 are adapted to move downward so as to remove the toner therearound as shown in FIG. 12 by pivotal movement of a rotary lever 46 rotated by a solenoid V (FIG. 10) which is actuated, for example, when a detecting device (not shown) including a small lamp and a photocell (not shown) and provided in the path of transportation of the copy paper detects that the width of the copy paper is smaller than the predetermined width. Upon de-energization of the solenoid V, the movable magnetic brush height regulating plates 42 are moved upward as shown in FIG. 13. The above arrangement is intended to prevent the toner from adhering to the reverse surface of the copy paper in cases where the copy paper is undesirably raised due to functioning of the feeding rollers, etc. upon entry of the opposite sides of the copy paper into the magnetic brush bristles of the toner 32 when the width of the copy paper fed onto the developing roller 34 through feeding rollers 8D is smaller than the width of a layer of the toner 32 formed on the stationary sleeve 35.

On the other hand, as is seen from FIG. 1, the transporting device 50 includes a conventional transporting endless belt 51 disposed between the developing device 30 and the fixing device F and movably supported by a plurality of rollers, and rotary discs 52 rotatably provided above the belt 51 and having many saw-tooth like projections 53 (FIG. 15) formed on the peripheral edges thereof.

Generally, the circumferential speed of the pressure rollers 11 in the fixing device F is set to be lower than the feeding speed of the copy paper. Therefore, in cases where the copy paper 9*c* having a long length is fed so as to extend over the developing device 30 and the fixing device F, if the rotary discs 52 are fixed in their positions, the copy paper 9*c* is gradually formed into a loop, and when the resiliency of the copy paper exceeds a predetermined level, slippage finally takes place between the rotary disc 52 and the copy paper, with a consequent rapid backward movement of the trailing edge of the copy paper through the developing device 30, thus resulting in an adverse effect an the developing.

Figure 14:
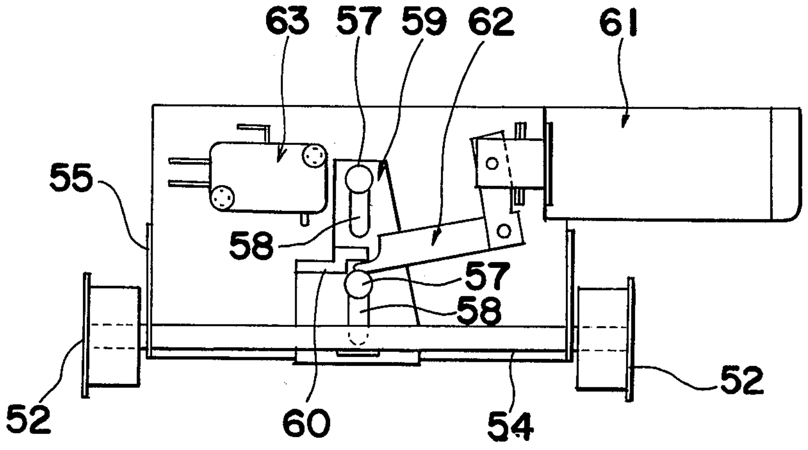
FIG. 14 is a front elevational view of a copy paper transporting device employed in the copying apparatus of FIG. 1.
Figure 15:
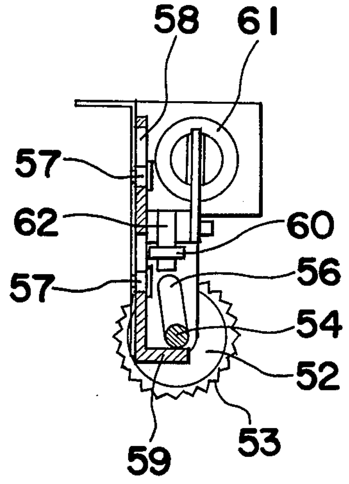
FIG. 15 is a side sectional view of the transporting device of FIG. 14.

Therefore, according to the present invention, as shown in FIGS. 14 and 15, the shaft 54 of the rotary discs 52 is slidably supported at opposite ends thereof in elongated slots 56 formed in the walls of a casing 55 of the device 50, and is also secured to a cam plate 59 which is guided for vertical movement by elongated grooves 58 and corresponding pins 57 fixed to the casing 55. When the original platform 14 has scanned more than a predetermined distance, i.e. when the copy paper size is larger than the predetermined size, the platform 14 actuates a microswitch (not shown) so as to energize a solenoid 61 for raising a projection 60 on the cam plate 59 by a lever 62 coupled to the plunger of the solenoid 61, and thus, the rotary discs 52 are spaced from the copy paper transporting path. In the above case, when a microswitch 63 disposed above the projection 60 is actuated by said projection 60 raised in the above described manner, the solenoid 61 is self-held. In other words, when the copy paper size is large, since the rotary discs 52 do not depress the copy paper surface, the loop of natural configuration, which will not rapidly collapse, is formed, and thus, there is no possibility of adversely affecting the developing. Subsequently, when the platform 14 has returned to the stationary state, a stopping position detecting switch (not shown) is actuated to release the solenoid 61 for causing the rotary discs 52 to descend again to the original position.

Referring particularly to FIGS. 16 to 20, the original platform driving mechanism 70 includes a clutch unit driving shaft 72 which is rotatably supported by a pair of spaced side plates 71, two clutch unit driving sprockets 73 fixedly mounted on the shaft 72, a shaft 75*a* for a scan clutch 74 and another shaft 75*b* for a return clutch 88 which are also rotatably supported by the side plates 71, with a first wire pulley 77 and a second wire pulley 90 being secured to corresponding ends of the shafts 75*a* and 75*b* extending outwardly through one of the side plates 71 as shown. In a position corresponding to the clutch unit driving sprockets 73 mounted on the shaft 72, a scan driving sprocket 78 including a gear 79 and a sprocket 80 is rotatably mounted on a clutch shaft 75*a* together with a clutch operating holder 81, on which a scan ratchet 82 is also rotatably mounted and a stop ring 83 is provided. Between the scan ratchet 82 and the stop ring 83, a compression spring 85 is disposed through a spring holder 84, with the scan ratchet 82 contacting the clutch operating holder 81 under pressure via a brake member 86. A kick spring 87 held at its one end by the scan driving sprocket 78 and at its other end by the clutch operating holder 81 is disposed to provide a small clearance with respect to a clutch drum 76 so that upon application of a torsion to the opposite ends of the kick spring 87, the spring diameter is reduced for bringing the clutch drum 76 into pressure contact.

As compared with the construction of the scan clutch 74 mounted on the clutch shaft 75*a* as described in the foregoing, the construction of the return clutch 88 mounted on the clutch shaft 75*b* is generally similar with the exception that the sprocket 80 for the scan clutch 74 is omitted in the return clutch 88, and a return drive transmission gear 79*a* of the return clutch 88 engages the gear 79 of the scan clutch 74 as shown. Therefore, a detailed description of the construction of the return clutch 88 is omitted for brevity, with like parts designated by like reference numerals.

Figure 16:
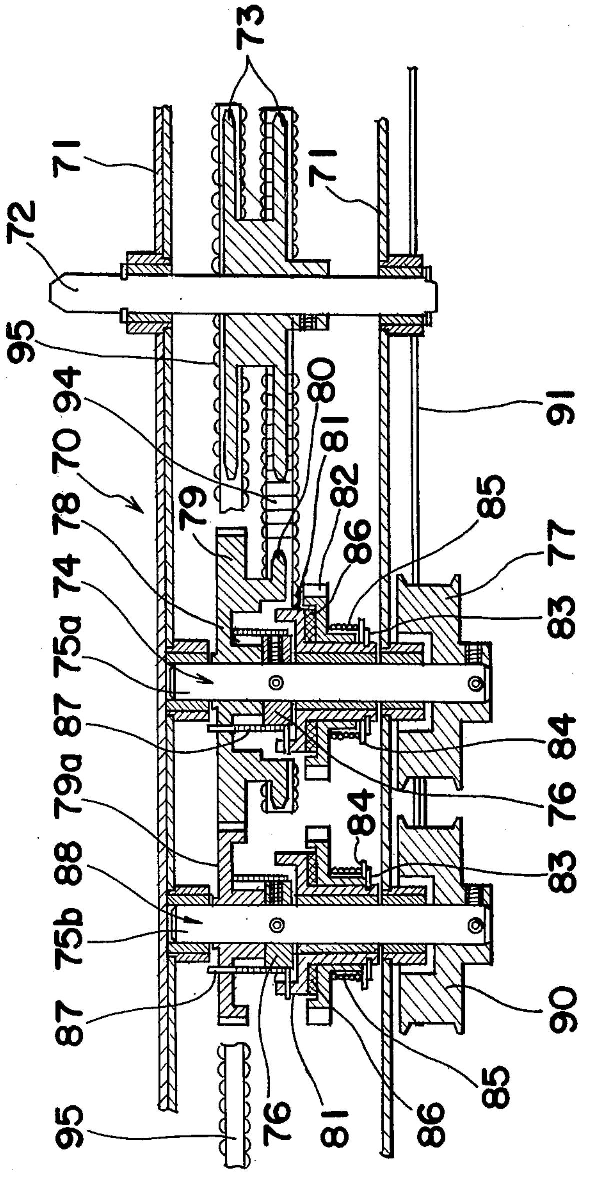
FIG. 16 is a cross sectional view showing on an enlarged scale, the construction of an original platform driving mechanism employed in the copying apparatus of FIG. 1.
Figure 17:
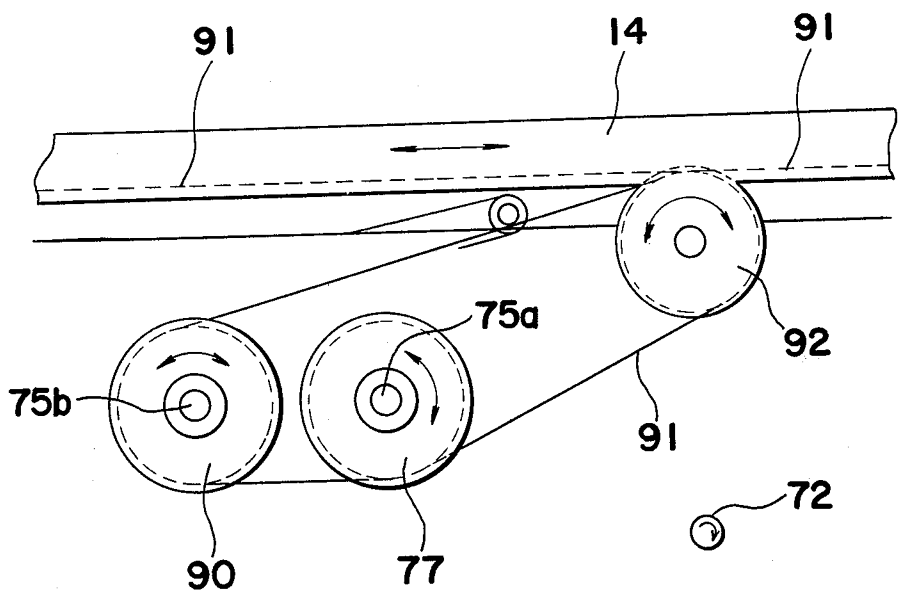
FIG. 17 is a schematic front elevational view of the original platform driving mechanism of FIG. 16, and FIGS. 18 to 20 are schematic diagrams for explaining the functioning of the original platform driving mechanism of FIG. 16.

As shown in FIG. 17, a platform driving wire 91 is passed around the first and second wire pulleys 77 and 90 respectively secured to the clutch shafts 75*a* and 75*b*, by a wire pulley 92 rotatably supported on the corresponding side plate 71. One end of the wire 91 is connected to a forward end of the platform 14, and the other end thereof is connected to the rear end of the platform 14 through a spring (not shown). One of the clutch unit driving sprockets 73 is directly connected to the scan driving sprocket 80 through a drive transmission chain 94 as shown in FIGS. 16 and 18, while the other of the sprockets 73 is coupled to a driving source (not shown) by a chain 95.

Figure 18:
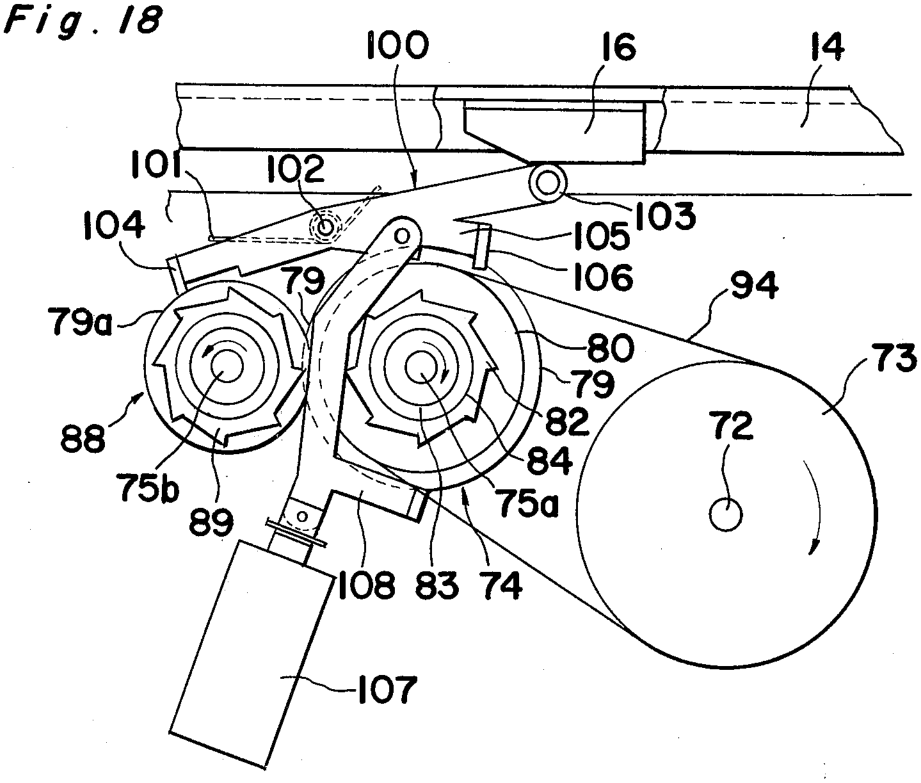
Figure 19:
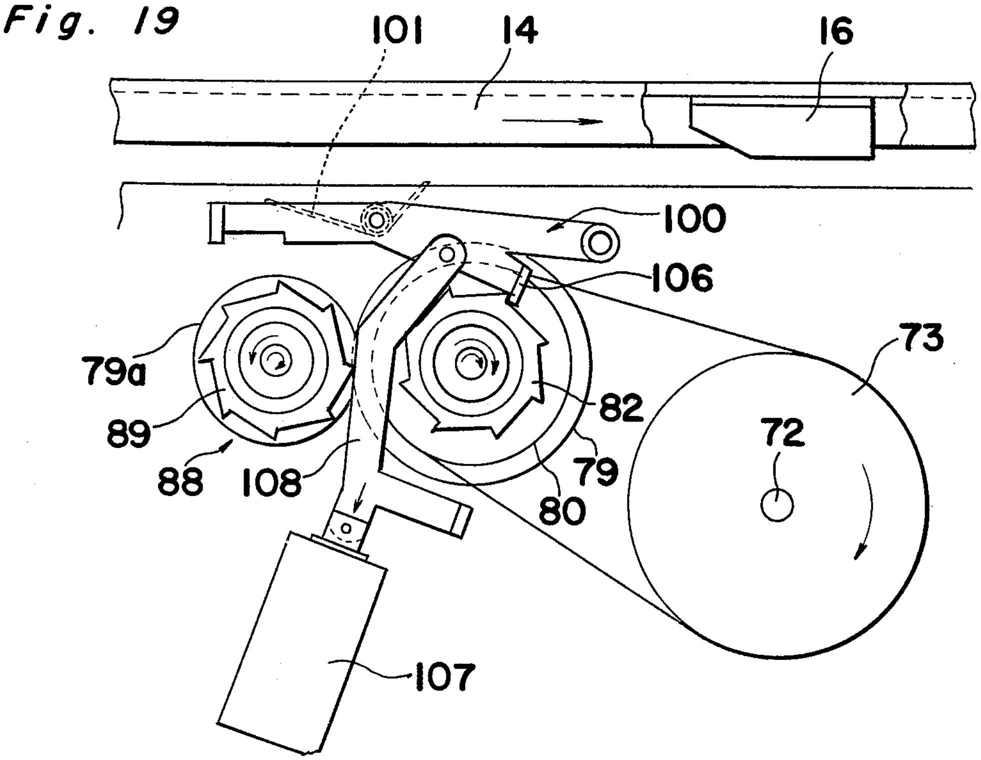
Figure 20:
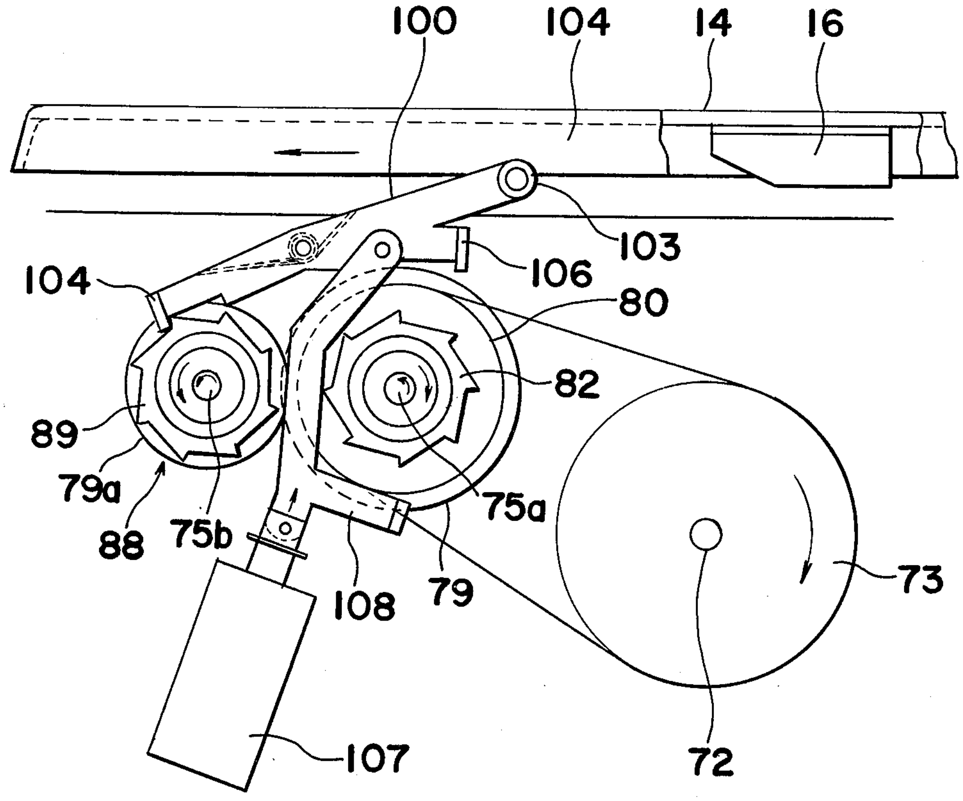

As shown in FIGS. 18 and 19, there is provided on the apparatus housing Ga, a first clutch operating lever 100 which is urged counterclockwise about a shaft 102 by a return drive spring 101. The clutch operating lever 100 has, at its one end, a roller 103 engageable under pressure with a contact piece 16 provided on a lower surface at one side of the platform 14, and has at the other end thereof, a pawl 104 engageable with the return ratchet 89, and also has another pawl 106 engageable with the scan ratchet 82 on an arm 105 extending outwardly from one side edge of the lever 100. Moreover, on the apparatus housing Ga, there is provided a scan drive solenoid 107 which is actuated by the turning ON of a print switch (not shown), and a second clutch operating lever 108 connected at its one end to the plunger of the solenoid 107 is pivotally connected at the other end thereof to the arm 105 of the first clutch operating lever 100.

By the above arrangement, when a power switch (not shown) is turned ON, with the first clutch operating lever 100 being in the state as shown in FIG. 18, the driving source is actuated to turn the clutch unit driving sprockets 73 through the drive transmission chain 95, with consequent rotation of the scan driving sprocket 80 and the gear 79, and also of the return drive transmission gear 79*a* in mesh with the gear 79. By the above rotation, the clutch operating holders 81 for the scan clutch 74 and return clutch 88 are relatively rotated with respect to the clutch shafts 75*a* and 75*b* by the kick springs 87. In the above case, when the print switch is turned ON, the scan driving solenoid 107 is energized and self-held, and as shown in FIG. 19, the pawl 106 of the first clutch operating lever 100 engages the scan ratchet 82. When the scan drive sprocket 80 continues to rotate in the above state, the revolutions of the scan driving sprocket 78 and clutch operating holder 81 are relatively altered, since the scan ratchet 82 is prevented from rotating, with a tortional force applied to the kick spring 87 for pressure contact with the surface of the clutch drum 76.

Accordingly, the rotational force of the scan driving sprocket 78 is transmitted to the clutch shaft 75*a* for rotating the first wire pulley 77, which in turn rotates the wire pulley 72 through the wire 91, and thus, the platform 14 is scanned toward the right in FIG. 17.

Subsequently, upon termination of the copying, the scan drive solenoid 107 is de-energized by a termination signal, and the first clutch operating lever 100 is pivoted counterclockwise by the force of the spring 101, so that the pawl 104 engages the return ratchet 89, while the pawl 106 is disengaged from the scan ratchet 82.

More specifically, in the above state, the second wire pulley 90 is rotated in the reverse direction to that in the previous case by the engagement between the gears 79 and 79*a*, and thus, the platform 14 moves toward the left for returning. When the platform 14 has returned to the predetermined position, the contact piece 16 provided on the platform 14 is brought into pressure contact with the roller 103 of the first clutch operating arm 100, and the first clutch operating arm 100 is pivoted clockwise for disengaging the pawl 104 from the return ratchet 89, by which action the driving force for the first and second wire pulleys 77 and 90 is interrupted and thus the platform 14 is stopped to complete one copying cycle. In the above case, if the apparatus is set for "multi-copy", a multi-copy switch (not shown) is turned ON upon returning of the platform 14 for similar functioning as in the case where the print switch is turned ON, and the copying operation as described earlier is repeated the number of times for which the multi-copy switch has been set.

In both of the above cases, when the pawl 104 or 106 is disengaged from the scan ratchet 82 or return clutch 89, the kick spring 87 is restored to the original state, since the clutch operating holder 81 is rotatable with respect to the clutch shaft 75.

As is clear from the foregoing description, according to the present invention, in the copying apparatus including the rotatable photosensitive drum, a scanning system for projecting the image of the original onto the photosensitive drum in synchronization with the rotation of the drum, a transfer device for transferring the image formed on the photosensitive drum onto the copy paper, and cutter means for cutting the copy paper in roll form into a predetermined length, the distance on the photosensitive drum from the exposure position to the transfer position is made larger than the distance along the copy paper path from the copy paper cutting position of the cutter means to the transfer position so that the cutter means is actuated after the termination of the exposure, by which arrangement, defects such as blurring and the like do not appear in the copied images even if vibrations are generated during functioning of the cutter means, and thus, copied images having very superior quality are obtainable.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. An electrophotographic copying apparatus which comprises a rotatable photosensitive drum having a photosensitive surface on the outer periphery thereof, a scanning device for projecting an image of an original to be copied onto said photosensitive surface at an exposure position in synchronization with the rotation of said photosensitive drum so as to form the image of the original on said photosensitive surface, a transfer device for transferring the image formed on said photosensitive surface onto copy paper at a transfer position, cutter means for cutting the copy paper from a roll of copy paper into a predetermined size at a copy paper cutting position, the distance between said exposure position and transfer position along said photosensitive surface being greater than the distance along the transporting path of the copy paper between said copy paper cutting position and said transfer position, and means operatively associated with said scanning device for actuating said cutter means only after termination of the exposure.

2. An electrophotographic copying apparatus which comprises in combination a rotatable photosensitive drum having a photosensitive surface on the outer periphery thereof, a scanning means for projecting an image of an original to be copied onto said photosensitive drum at an exposure position so as to form an image corresponding to the original on said photosensitive surface, an image transfer means for transferring the image formed on said photosensitive drum onto copy paper at a transfer position, a cutter means for cutting the copy paper from a roll of copy paper into a predetermined size at a copy paper cutting position, the distance between said exposure position and transfer position along said photosensitive surface being greater than the distance between said copy paper cutting position and said transfer position along the path of transportation of the copy paper, and a cutter operating means including a size setting means for designating a length of the copy paper to be cut, a rod-like support member associated with said size setting means and having a plurality of actuating pieces each of which is on said support member in a position deviated from the other support members, a switch means actuatable by a selected one of said actuating pieces for operating said cutter means to cut the copy paper into a predetermined size corresponding to the size designated by said size setting means, said switch means being actuated by the selected actuating piece after termination of the exposure.

3. An electrophotographic copying apparatus which comprises in combination a rotatable photosensitive drum having a photosensitive surface on the outer periphery thereof, a scanning means for projecting an image of an original to be copied onto said photosensitive drum at an exposure position so as to form an image corresponding to the original on said photosensitive surface, an image transfer means for transferring the image formed on said photosensitive drum onto copy paper at a transfer position, a cutter means for cutting the copy paper from a roll of copy paper into a predetermined size at a copy paper cutting position, the distance between said exposure position and transfer position along said photosensitive surface being greater than the distance between said copy paper cutting position and said transfer position along the path of transportation of the copy paper, and a cutter operating means including a rotatable rod-like support member extending in a direction parallel to the direction of movement of said scanning system, a plurality of actuating pieces around the periphery of said rod-like support member and sequentially spaced in the circumferential direction of said rod-like support member and spaced from each other by predetermined distances in the axial direction of said rod-like support member corresponding to the sizes of the sheets of copy paper to be cut, cutter operating switch means actuable by a selected one of said actuating pieces after termination of exposure, and size setting means for rotating said rod-like support member so as to bring the selected one of said actuating pieces into a locus of relative movement in which it can actuate said cutter operating switch means, one of said cutter operating switch means and said rod-like support member being movable with said scanning device as one unit, and the other of said cutter operating switch means and rod-like support member being fixed.

4. An electrophotographic copying apparatus as claimed in claim 3, wherein said cutter operating switch means is directly actuated by the selected one of said actuating pieces.

5. An electrophotographic copying apparatus as claimed in claim 3, wherein said cutter operating switch means includes lever means which is engaged by the selected one of said actuating pieces for operating said switch means.

6. An electrophotographic copying apparatus as claimed in claim 3, wherein said rod-like support member of said cutter operating means has a polygonal cross section and said actuating pieces are mounted on respective polygonal surfaces thereof.

7. An electrophotographic copying apparatus as claimed in claim 3, wherein said size setting means includes a rotatable size setting dial and transmission means for transmitting the rotation of said rotatable size setting dial to said rod-like support member.

8. An electrophotographic copying apparatus as claimed in claim 7, wherein said transmission means includes a plurality of gears.

9. An electrophotographic copying apparatus as claimed in claim 7, wherein said rotatable size setting dial has a size indicating portion thereon.

* * * * *